United States Patent
Lapeyre et al.

(10) Patent No.: US 12,304,068 B2
(45) Date of Patent: May 20, 2025

(54) ARTICULATION HAVING THREE DEGREES OF FREEDOM FOR A ROBOT, AND CORRESPONDING CONTROL METHOD

(71) Applicant: POLLEN ROBOTICS, Bordeaux (FR)

(72) Inventors: Matthieu Lapeyre, Bordeaux (FR); Pierre Rouanet, Bordeaux (FR); Augustin Crampette, Bordeaux (FR)

(73) Assignee: POLLEN ROBOTICS, Bordeaux (FR)

( * ) Notice: Subject to any disclaimer, the term of this patent is extended or adjusted under 35 U.S.C. 154(b) by 149 days.

(21) Appl. No.: 17/774,764

(22) PCT Filed: Nov. 2, 2020

(86) PCT No.: PCT/EP2020/080666
§ 371 (c)(1),
(2) Date: May 5, 2022

(87) PCT Pub. No.: WO2021/089474
PCT Pub. Date: May 14, 2021

(65) Prior Publication Data
US 2022/0395973 A1    Dec. 15, 2022

(30) Foreign Application Priority Data
Nov. 5, 2019  (FR) ........................................ 1912398

(51) Int. Cl.
*B25J 9/00* (2006.01)
*B25J 9/10* (2006.01)
(Continued)

(52) U.S. Cl.
CPC ............. *B25J 9/0048* (2013.01); *B25J 9/102* (2013.01); *B25J 9/1623* (2013.01); *B25J 17/00* (2013.01)

(58) Field of Classification Search
CPC ........ B25J 9/0048; B25J 9/102; B25J 9/1623; B25J 17/00
See application file for complete search history.

(56) References Cited

U.S. PATENT DOCUMENTS

| | | | |
|---|---|---|---|
| 9,109,743 B2 * | 8/2015 | Schwab | .................. F16H 21/46 |
| 2002/0029610 A1 * | 3/2002 | Chrystall | ............. A43D 999/00 |
| | | | 73/7 |

(Continued)

FOREIGN PATENT DOCUMENTS

| | | |
|---|---|---|
| CN | 107932480 A | 4/2018 |
| CN | 108972505 A | 12/2018 |

OTHER PUBLICATIONS

Translation of CN 108972505, 2018.*

(Continued)

*Primary Examiner* — Terence Boes
(74) *Attorney, Agent, or Firm* — CHRISTENSEN O'CONNOR JOHNSON KINDNESS PLLC

(57) ABSTRACT

Articulation having three degrees of freedom for a robot, comprising a platform (2), three motors (3a,3b,3c) each connected to a ring gear (4,4a,4b,4c) via a pinion (5a,5b,5c), each ring gear (4,4a,4b,4c) being arranged inside a hollow disk (6a,6b,6c) stacked on the base, such that each disk (6,6a,6b,6c) is as one with a ring gear (4,4a,4b,4c), each disk (6,6a,6b,6c) is moreover itself as one with a disk head (7,7a,7b,7c) extending in the same direction as the stack of the base and of the disks (6,6a,6b,6c), for each disk head (7,7a,7b,7c), an arm (8,8a,8b,8c) is connected in rotation on one hand to the disk head (7,7a,7b,7c) and on the other hand to the platform (2), each motor (3a,3b,3c) being at least partially contained inside at least one disk (6,6a,6b,6c).

5 Claims, 2 Drawing Sheets

(51) Int. Cl.
*B25J 9/16* (2006.01)
*B25J 17/00* (2006.01)

(56) References Cited

U.S. PATENT DOCUMENTS

2010/0043577 A1    2/2010  Rosheim
2012/0286123 A1*  11/2012  Schwab .............. B23Q 1/5462
                                                   248/346.06

OTHER PUBLICATIONS

Bulgarelli, A., et al., "A Low-Cost Open Source 3D-Printable Dexterous Anthropomorphic Robotic Hand With A Parallel Spherical Joint Wrist for Sign Languages Reproduction," International Journal of Advanced Robotic Systems 13(3):1, Jun. 2016.
Omarali, B., et al., "System Integration of a Solar Sensor and a Spherical Parallel Manipulator for a 3-Axis Solar Tracker Platform Design," IEEE/SICE International Symposium on System Integration (SII), 2015, pp. 546-551.

* cited by examiner

ARTICULATION HAVING THREE DEGREES OF FREEDOM FOR A ROBOT, AND CORRESPONDING CONTROL METHOD

TECHNICAL FIELD

The technical field of the invention is actuators for robots, and more particularly actuators with three axes of freedom.

The technical field of the invention is also the controlling of actuators with three axes of freedom.

PRIOR ART

The development of social robots, capable of having a natural interaction with humans in public and domestic spaces, in particular for an entertainment usage of the robots.

Such robots must in particular have the following characteristics
- be safe in the interactions, in particular physical interactions during contacts or manipulations carried out by man,
- make it possible to perform dynamic movements, in order to be reactive to an unplanned event but also to create more enjoyable interactions and favour an illusion of life,
- allow quality animations to be performed, that favour the intuitive comprehension in humans of the intentions of the robot, and be capable of acting in the real physical world by manipulating objects The operating safety stems in particular from the mass of the robot or from its members in order to limit the inertia in the control and limit the risks of injuring the public.

In robots, when it is desired to create an articulation that has the possibility of moving according to three axes, the most frequently used technical solution is a chaining of three actuators in series. This is what is found on most industrial robots but also on humanoid robots at the shoulders and hips.

The problem with these series articulations is with the mechanism and the dynamics.

From a mechanism standpoint, the rotation properties of a ball head, which is to be able to rotate at any time in any direction, are carried out only around the initial zone. The farther away from this zone, the less the property of a ball head is retained. By moving even farther away, positions referred to as gimbal lock are reached where one of the degrees of freedom is lost.

From a dynamic standpoint, the first actuator of the series supports in addition to the useful load, the mass of the second and third actuators. Likewise for the second actuator that has to support the mass of the third actuator. Thus, in order to ensure that the articulation can be reactive and dynamic, it becomes necessary to oversize the first actuators which burdens the overall system and increases its inertia and its costs by as much.

An alternative to articulations with series actuators are articulations with parallel actuators. These mechanisms are much more complex to carry out and to control but have the advantage that all the actuators are fixed to the frame of the robot. This makes it possible to have both a much lighter structure on the mobile portion and in addition to benefit from the addition of the powers of each one of the actuators in order to move the structure. In the end, this makes it possible to design very dynamic systems, capable of moving quickly and accurately.

From the prior art, the following examples of articulations with parallel actuators are known.

The document Bulgarelli et al. ("A Low-Cost Open Source 3D Printable Dexterous Anthropomorphic Robotic Hand with a Parallel Spherical Joint Wrist for Sign Languages Reproduction", A. Bulgarelli et al., International Journal of Advanced Robotic Systems, Vol. 13, Issue 3, Jan. 1, 2016) discloses such an articulation with parallel actuators with the purpose of developing an artificial wrist for the remote communication of sign language.

The document Bulgarelli et al. discloses a controlling of the articulation via a Euler angle representation. Such a representation is conventionally used for such complex systems but is unstable. It can therefore lead to a gimbal lock.

In addition, when moving away from the initial position of the articulation, it becomes increasingly difficult to characterise the direction that is sought to be given because it is then required to know how to combine rotations about different axes, which becomes complex in such a situation by using a Euler representation.

The document Sudki et al. ("Marine Propulsor based on a Three-Degree-of-Freedom Actuated Spherical Joint", Third International Symposium on Marine Propulsors, smp'13, May 2013) discloses an actuator with three degrees of freedom for a marine propulsor so as to replicate the shoulder of marine animals, in particular the penguin.

The articulations with parallel actuators of the prior art have the disadvantage of a substantial size of the frame on which the motors are fixed. These articulations are difficult to integrate into a mobile robot.

The technical problem to be solved is how to benefit from the advantages of a parallel actuator by having a reduced size.

DISCLOSURE OF THE INVENTION

One object of the invention is an articulation having three degrees of freedom for a robot, comprising a platform, three motors each connected to a ring gear via a pinion, each ring gear being disposed inside a hollow disc stacked on the base, such that each disc is as one with a ring gear, each disc is moreover itself as one with a disc head extending in the same direction as the stack of the base and of the discs, for each disc head, an arm is connected in rotation on one hand to the disc head and on the other hand to the platform, each motor being at least partially contained inside at least one disc.

Each motor can be offset with respect to the axis of rotation of the discs and disposed in a different angular sector, such as to contain the three motors in the cavity delimited by the base and the stacked discs.

The position at rest of each disc head can have an offset angle corresponding to the offset angle between the motors.

Each motor can moreover be provided with means for determining the output shaft of the motor with respect to a reference position, in particular magnetic encoders.

Another object of the invention is a method for controlling an articulation with three axes of freedom making it possible to direct the platform according to a required position of a vector linked to the platform and a required angle of rotation about the vector linked to the platform, the method comprising the steps of:

determining the coordinates of the three-axis reference frame linked to the platform of the articulation for the initial position and receiving the vector normal to the platform corresponding to the required position and a required angle of rotation, determining the coordinates of the rotation vector making it possible to pass from the initial position of the platform to an intermediate position of the platform in the three-axis reference frame linked to the platform of the articulation for the initial position, the intermediate position being such that the passing from the intermediate position of the platform to the required position involves a rotation of the platform on itself according to a required angle of rotation, determining an angle of initial rotation making it possible to pass from the initial position of the platform to an intermediate position of the platform, determining the coordinates of the three-axis reference frame linked to the platform of the articulation for the required position in the three-axis reference frame linked to the platform of the articulation for the initial position determining the angle of rotation of the first arm according to the coordinates of the three-axis reference frame linked to the platform of the articulation for the required position in the three-axis reference frame linked to the platform of the articulation for the initial position of the required angle of rotation, of the angle of initial rotation and of parameters linked to the construction of the articulation, determining the angle of rotation of the second arm according to the coordinates of the three-axis reference frame linked to the platform of the articulation for the required position in the three-axis reference frame linked to the platform of the articulation for the initial position, of the required angle of rotation added to an angular offset value, of the angle of initial rotation and of parameters linked to the construction of the articulation, determining the angle of rotation of the third arm according to the coordinates of the three-axis reference frame linked to the platform of the articulation for the required position in the three-axis reference frame linked to the platform of the articulation for the initial position, of the required angle of rotation less the angular offset value, of the angle of initial rotation and of parameters linked to the construction of the articulation, for each disc, an angle of rotation of the disc is determined according to the angle of rotation of the corresponding arm and of the coordinates of the three-axis reference frame linked to the platform of the articulation for the required position in the three-axis reference frame linked to the platform of the articulation for the initial position, each motor is controlled with the angle of rotation of the disc corresponding to the motor.

The rotation vector can be determined as the vector product between the vector normal to the platform in the initial position and the vector normal to the platform in the required position.

The parameters linked to the construction of the articulation can be the diameter of the distal circle, the diameter of the proximal circle and the centre of the proximal circle. The distal circle is the circle traced by an arm around the platform. The proximal circle is the circle traced by the discs.

The angle of rotation can be defined as the arc cosine of the scalar product of a vector normal to the platform in the initial position by a vector normal to the platform in the required position.

To determine the coordinates of the three-axis reference frame linked to the platform of the articulation for the required position in the three-axis reference frame linked to the platform of the articulation for the initial position, a first quaternion is determined making it possible to pass from the initial position to the intermediate position and a second quaternion making it possible to pass from the intermediate position to the required position by a rotation of the platform on itself, the required position of the platform in the reference frame of the platform in the initial position can be determined by applying in succession the two quaternions to the initial position of the platform.

The system according to the invention has the advantage of being reversible, i.e. the articulation can operate as a transducer. In other terms, an action on the articulation is transformed by the motors into electric current.

BRIEF DESCRIPTION OF THE DRAWINGS

Other purposes, characteristics and advantages of the invention shall appear when reading the following description, given solely as a non-limiting example and in reference to the accompanying drawings wherein.

DETAILED DESCRIPTION

The articulation according to the invention comprises a system of three concentric axes controlling the actuator. The motors setting into motion the concentric axes are integrated inside the articulation.

The articulation 1 makes it possible to displace a platform 2 according to three axes of freedom with respect to a base by controlling three motors in rotation.

Figure 1:
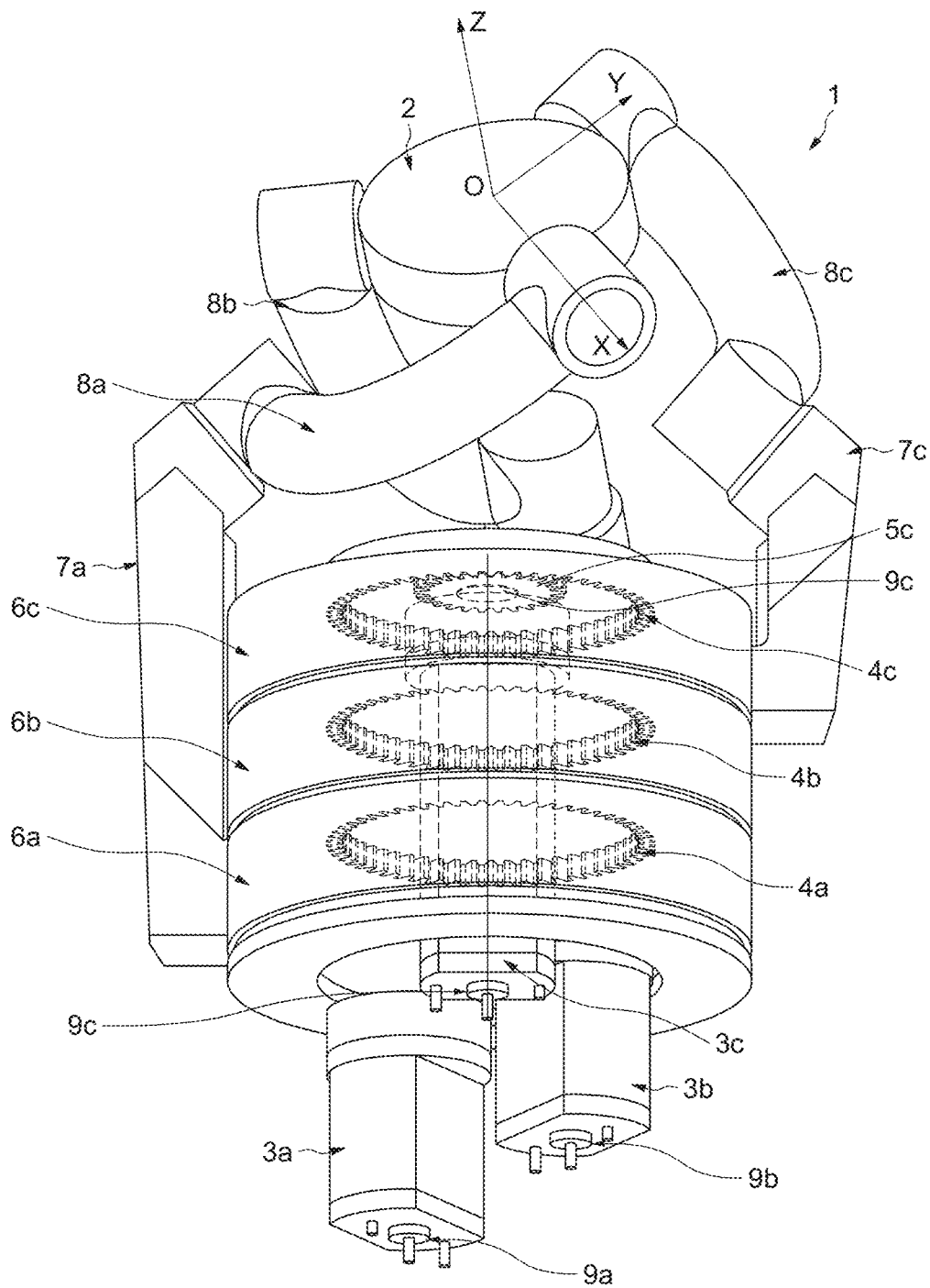
FIG. 1 shows a three-dimensional view of an articulation according to the invention.

The articulation 1 comprises a base wherein are disposed three motors $3a$, $3b$, $3c$ each connected to a ring gear $4a$, $4b$, $4c$ via a pinion $5a$, $5b$, $5c$. In FIG. 1, the motor $3c$ was shown inside ring gears $4a$, $4b$, $4c$. The motors $3a$ and $3b$ were not shown as a concern for clarity. However, the motor $3b$ is disposed inside ring gears $4a$, $4b$ and the motor $3a$ is disposed inside the ring gear $4a$. Each ring gear $4a$, $4b$, $4c$ is disposed inside a hollow disc $6a$, $6b$, $6c$ stacked on the base, such that each disc $6a$, $6b$, $6c$ is as one with a ring gear $4a$, $4b$, $4c$. Each disc $6a$, $6b$, $6c$ is moreover itself as one with a disc head $7a$, $7b$, $7c$ extending in the same direction as the stack of the base and of the discs $6a$, $6b$, $6c$. Each motor $3a$, $3b$, $3c$ is moreover provided with means for determining the angular position of the output shaft of the motor with respect to a reference position. Such means for determining can be angular position sensors or magnetic encoders $9a$, $9b$, and $9c$.

Figure 2:
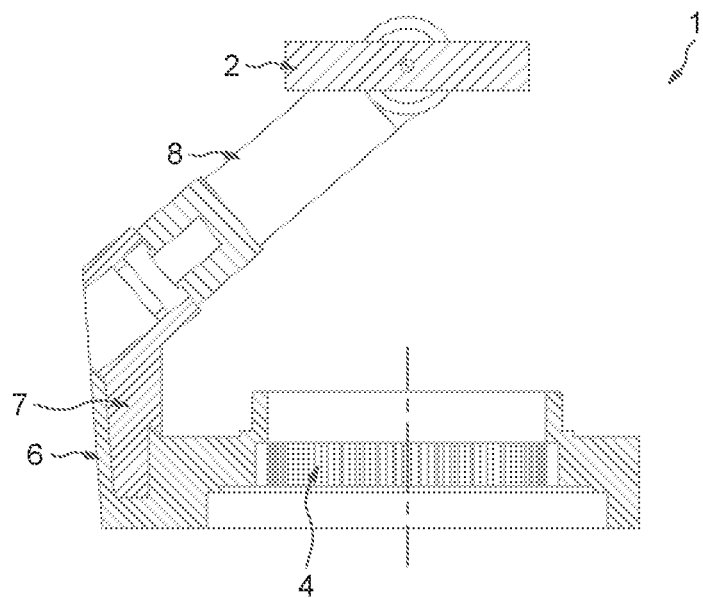
FIG. 2 shows a side view of an arm according to the invention.

FIG. 2 shows the connection of an arm with the platform and the disc in a general case that can be transposed for each arm $8a$, $8b$, $8c$.

For each disc head 7, $7a$, $7b$, $7c$, an arm 8, $8a$, $8b$, $8c$ in the shape of an arc, is connected in rotation on one hand to the disc head 7, $7a$, $7b$, $7c$ and on the other hand to the platform 2. The axis of rotation between the disc head 7, $7a$, $7b$, $7c$ and the arm 8, $8a$, $8b$, $8c$ and the axis of rotation between the arm 8, $8a$, $8b$, $8c$ and the platform 2 are comprised in the same plane as the one comprising the corresponding arm 8, 8a, 8b, 8c. Advantageously, the arc shape represents a quarter of a circle.

The discs 6, 6a, 6b, 6c form casings and are provided with bearings making it possible to facilitate the movement thereof, reduce friction and wear and maintain the alignment of the discs 6, 6a, 6b, 6c with respect to the base and between them.

In other terms, a first disc 6a is connected to a first arm 8a via a disc head 7a, the first disc 6a being driven by a first motor 3a via a first ring gear 4a, and a first pinion 5a.

The same arrangement is provided for the second disc 6b and the third disc 6c.

More precisely, a second disc 6b is connected to a second arm 8b via a disc head 7b, the second disc 6b being driven by a second motor 3b via a first ring gear 4b, and a second pinion 5b. Likewise, a third disc 6c is connected to a third arm 8c via a disc head 7c, the third disc 6c being driven by a third motor 3c via a first ring gear 4c, and a third pinion 5c.

The first disc 6a is stacked on the second disc 6b, itself stacked on the third disc 6c. The third disc 6c is disposed on the base. The first arm 6a, the second arm 6b and the third arm 6c are connected to the platform.

Figure 3:
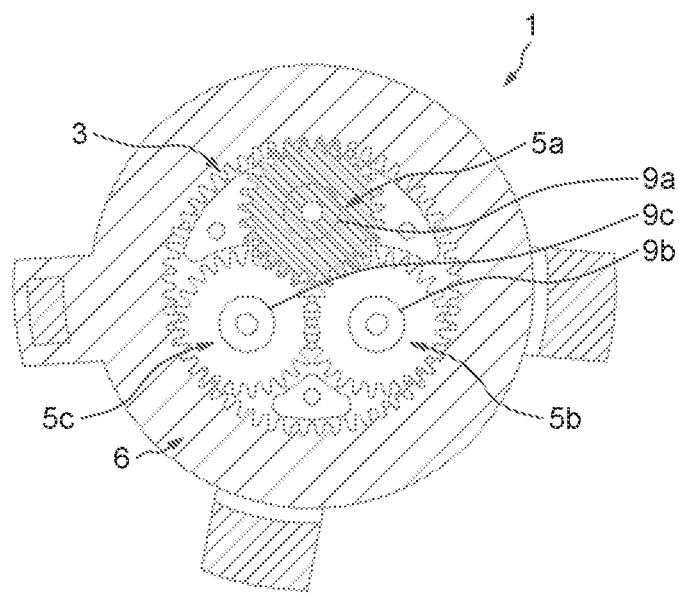
FIG. 3 shows a cross-section view of a disc according to the invention.

In reference to FIG. 1, it can be seen that each pinion 5a, 5b, 5c is disposed at a difference height from the base in such a way as to mechanically drive the corresponding ring gear 4a, 4b, 4c. In addition, such as to contain the three motors 3a, 3b, 3c in the cavity delimited by the base and the stacked discs 6a, 6b, 6c, each motor 3a, 3b, 3c is offset with respect to the axis of rotation of the discs 6a, 6b, 6c and disposed in a different angular sector. This disposition is shown in FIG. 3. Thus, with three motors 3a, 3b, 3c, each motor 3a, 3b, 3c is disposed in a different 120° sector.

This offset angle of 120° is also found at the position at rest of each disc head 7, 7a, 7b, 7c, each disc head 7, 7a, 7b, 7c being disposed at 120° from the other two.

The motors 3a, 3b, 3c are controlled to control the orientation of the platform 2, which drives a rotation of each disc 6a, 6b, 6c on a circle referred to as proximal circle. The rotation of each disc 6a, 6b, 6c drives the rotation of the arm 8a, 8b, 8c which is mechanically connected on another circle, referred to as distal circle.

In reference to FIG. 1, it can be seen that a reference frame R linked to the platform 2 is shown there. The direct orthonormal three-dimensional reference frame R is defined as comprising an origin O(0,0,0) located at the barycentre of the platform 2, a vector Z(0,0,1) normal to the platform 2, a vector Y(0,1,0) extending parallel to the surface of the platform 2 and passing through the connection of the third arm 8c with the platform 2, a vector X(1,0,0) orthogonal to vectors X and Y, and forming a direct orthogonal reference frame. Recall that a three-dimensional direct reference frame is a reference frame wherein the angle between the vector X and the vector Y is a direct angle, between the vector Y and the vector Z is a direct angle and between the vector Z and the vector X is a direct angle.

Interest shall now be given to the controlling of the system making it possible to position the platform 2 in a predetermined position.

In order to prevent a gimbal lock, a representation in the form of a quaternion is used. The quaternion is a normalised vector of the three-dimensional space combined with a rotation by an angle θ around this vector.

The following magnitudes are defined:
R0=(X0, Y0, Z0): Direct orthogonal reference frame defining the initial position of the platform 2

Rreq=(Xreq, Yreq, Zreq) Direct orthogonal reference frame defining the required position of the platform 2

V=(a, b, c): rotation vector orthogonal to the plane defined by the vectors R0 and Rreq θ: angle of rotation around the vector V defining the required position for the platform 2, β: angle of rotation of the platform 2 on itself between the initial position and the required position.

It is sought to control the platform 2 in such a way that it passes from an initial position defined by the reference frame R0 to a required position defined by the reference frame Rreq.

The movement is then broken down into two rotations. A first rotation is a rotation by an angle θ around a vector V normal to the plane defined by the reference frames R0 and Rreq.

A second rotation is a rotation by an β around the vector normal of the platform 2. Note that the normal vector of the platform 2 can be the vector Z0, Zreq or any other intermediate vector.

The chaining of the rotations is indifferent. Thus, the second rotation can be carried out before the first rotation.

The vector V is then defined as the vector product of vectors Z0 and Zreq in the following way:

$$\vec{V} = \vec{Z0} \times \vec{Zreq}$$ [Math 1]

The angle of rotation θ is defined according to the components of R0 and Rreq normal to the platform 2.

$$\theta = a\cos(Z0 \cdot Zreq)$$ [Math 2]

The vector V is then normalised to be able to be used with the quaternions.

The first quaternion q1 associated with the first rotation by an angle θ around the vector V is written in the following way $$q1 = (w1, x1, y1, z1)$$ [Math 3]

With:

$$w1 = \cos\left(\frac{\theta}{2}\right)$$ [Math 4]

$$x1 = \sin\left(\frac{\theta}{2}\right) * a1$$ [Math 5]

$$y1 = \sin\left(\frac{\theta}{2}\right) * b1$$ [Math 6]

$$z1 = \sin\left(\frac{\theta}{2}\right) * c1$$ [Math 7]

A second quaternion q2 is then defined, making it possible to carry out the second rotation by angle β around the vector normal to the platform 2. By using the same formalism as that presented for the first quaternion q1, the following is obtained:

$$q2 = (w2, x2, y2, z2)$$ [Math 8]

With:

$$w2 = \cos\left(\frac{\beta}{2}\right)$$ [Math 9]

$$x2 = \sin\left(\frac{\beta}{2}\right) * a2$$ [Math 10]

$$y2 = \sin\left(\frac{\beta}{2}\right) * b2$$ [Math 11]

-continued $$z2 = \sin\left(\frac{\beta}{2}\right) * c2 \qquad [\text{Math 12}]$$

The vector normal to the platform 2 is of the form (0,0,Z). The terms x2 and y2 of the quaternion are then zero.

There are thus two quaternions associated with two rotations making it possible to pass from the reference frame R0 linked to the initial position to the reference frame Rreq linked to the required position.

It remains however necessary to determine angles of rotation of the three motors noted as θ11, θ12, θ13 in order to carry out the rotations defined by these quaternions in such a way that the arms move the platform 2 from the initial position R0 to the required position Rreq.

To determine these angles of rotation, the following elements are defined:
- Rd: the radius of the circle traced by an arm around the platform 2, also called distal circle
- Rp: the radius of the circle traced by the discs, also called the proximal circle
- Cp=(0, 0, Cz): the coordinates of the centre of the circle traced by the discs, also called proximal circle
- Pc=(0, 0, 0): the coordinates of the centre of the distal circle,
- θ3i the angle of the arm i with respect to the platform 2
- θ1i the angle of the disc i with respect to the reference position thereof The equations of the distal circles Xi and of the proximal circle $Xi_p$ are expressed by the following equations.

$$X_i = P_c + R\cos(\theta 3i)Z\text{req} + R\sin(\theta 3i)X\text{req} \qquad [\text{Math 13}]$$

$$Xi_p = C + R_p \cos(\theta 1i)X_0 + R_p \sin(\theta 1i)Y_0 \qquad [\text{Math 14}]$$

A first displacement is thus defined making it possible to pass from the initial position defined by the reference frame R0 to an intermediate position defined by the reference frame Rinter by applying the first quaternion q1:

$$R\text{inter} = q1 * R0 * \overline{q1} \qquad [\text{Math 15}]$$

A second displacement is defined making it possible to pass from the intermediate position defined by the reference frame Rinter to the required position defined by the reference frame Rreq by applying the second quaternion q2:

$$R\text{req} = q2 * R\text{inter} * \overline{q2} \qquad [\text{Math 16}]$$

When the quaternions on the coordinate Z are thus applied, the following is obtained:

$$Z\text{inter} = q1 * Z0 * \overline{q1} \qquad [\text{Math 17}]$$

$$Z\text{req} = q2 * Z\text{inter} * \overline{q2} \qquad [\text{Math 18}]$$

However, the rotation defined by the second quaternion q2 is carried out around the direction Z. The direction Z is therefore invariable and Zinter=Zreq is therefore derived therefrom.

Note that $\overline{q1}$ is the conjugate of the quaternion q1 is equal to the inverse of the quaternion q1 if the rotation vector is normalised. $\overline{q1} = q1^{-1}$ and $\overline{q2} = q2^{-1}$ are thus obtained.

As there is no rotation about the axes X and Y during the application of the second quaternion q2, the calculation of the coordinates Xreq and Yreq can be carried out in a single step involving the two quaternions q1 and q2.

$$X\text{req} = q2 * (q1 * X0 * \overline{q1}) * \overline{q2} \qquad [\text{Math 19}]$$

$$Y\text{req} = q2 * (q1 * Y0 * \overline{q1}) * \overline{q2} \qquad [\text{Math 20}]$$

Entailing a change in reference frame, the coordinates X0,Y0,Z0 and the coordinates Xreq,Yreq,Zreq are defined in the reference frame R0 linked to the initial position of the platform.

Thus, in the reference frame R0, we have the following expressions:

$$X0 = (X0, 0, 0)$$

$$Y0 = (0, Y0, 0)$$

$$Z0 = (0, 0, Z0)$$

$$X\text{req} = (Xx, Yx, Zx)$$

$$Y\text{req} = (Xy, Yy, Zy)$$

$$Z\text{req} = (Xz, Yz, Zz)$$

Knowing the coordinates Xreq,Yreq,Zreq, it is then possible to determine the angles of the discs θ11, θ12, θ13.

By solving the equation Xi=Xp stemming from equations Eq. 1 and Eq. 2, the following system of equations is obtained:

$$R\cos(\theta 3i) \times Z_z + R\sin(\theta 3i) \times X_x = R_p \cos(\theta 1i) \qquad [\text{Math 21}]$$

$$R\cos(\theta 3i) \times Y_z + R\sin(\theta 3i) \times Y_x = R_p \cos(\theta 1i) \qquad [\text{Math 22}]$$

$$Pc_z + R\cos(\theta 3i) \times Z_z + R\sin(\theta 3i) \times Z_x = C_z \qquad [\text{Math 23}]$$

By solving this system of equations [Math 21], [Math 22], [Math 23], the following expressions of angles θ3i and θ1i respectively are obtained.

$$\theta 3i = 2a\tan\left(\frac{RZ_x \pm \sqrt{(RZ_x)^2 + (RZ_z)^2 - (P_{cz} - C_z)^2}}{RZ_z + C_2 - P_{cz}}\right) \qquad [\text{Math 24}]$$

$$\theta 1i = a\tan 2(\cos(\theta 3i) \times Y_z + \sin(\theta 3i) \times Y_x, \cos(\theta 3i) \times X_z + \sin(\theta 3i) \times X_x) \qquad [\text{Math 25}]$$

The angle θ3i of each arm i of the system is first determined by application of the equation [Math 24]. The angle θ1i of each disc i of the system is then determined by application of equation [Math 25].

As was mentioned hereinabove, the vector Zreq is not modified by the rotation according to the second rotation angle β. On the other hand, the vectors Xreq and Yreq are indeed modified by this rotation.

At rest, each disc is offset by 120° with respect to one another. If the angular position of the first disc is taken as a reference, it is possible to obtain the angular position of the second disc by applying an offset of +120° on the second rotation angle β and the angular position of the third disc by applying an offset of −120° on the second rotation angle β.

It stems from this that the values Xx, Yx and Zx of the equations [Math 24] and [Math 25] are modified due to this offset.

The embodiment described hereinabove comprises a second rotation along the axis Z of the reference frame linked to the platform. In other embodiments, the second rotation can be carried out along the axis X or the axis Y, or along a vector linked to the platform. A person skilled in the art will adapt the mathematical formalism described hereinabove according to the axis considered.

Likewise the first rotation and the second rotation can be inverted interchanged without leaving the scope of the invention.

The method for controlling an articulation having three axes of freedom making it possible to direct the platform 2 according to a required position of the platform 2 and a required angle of rotation comprises the following steps.

During a first step, the coordinates of a direct orthonormal three-axis reference frame linked to the platform 2 of the articulation for the initial position is determined and the coordinates of a direct orthonormal three-axis reference frame linked to the platform 2 of the articulation for the required position and a required angle of rotation.

During a second step, the coordinates of a rotation vector V are determined making it possible to pass from the reference frame linked to the initial position of the platform 2 to a reference frame linked to an intermediate position of the platform 2 in the three-axis reference frame linked to the platform 2 of the articulation for the initial position, the intermediate position being such that the passing from the intermediate position of the platform 2 to the required position involves a rotation of the platform 2 on itself according to a required angle of rotation.

During a third step, an angle of initial rotation is determined making it possible to pass from the initial position of the platform 2 to an intermediate position of the platform 2.

During a fourth step, the coordinates of the three-axis reference frame linked to the platform 2 of the articulation for the required position in the three-axis reference frame linked to the platform 2 of the articulation for the initial position are determined.

During a fifth step, the angle of rotation of the first arm θ31 is determined according to the coordinates of the three-axis reference frame linked to the platform 2 of the articulation for the required position in the three-axis reference frame linked to the platform 2 of the articulation for the initial position of the required angle of rotation, of the angle of initial rotation and of parameters linked to the construction of the articulation.

During a sixth step, the angle of rotation of the second arm θ32 is determined according to the coordinates of the three-axis reference frame linked to the platform 2 of the articulation for the required position in the three-axis reference frame linked to the platform 2 of the articulation for the initial position, of the required angle of rotation added to an angular offset value, of the angle of initial rotation and of parameters linked to the construction of the articulation, During a seventh step, the angle of rotation of the third arm θ33 is determined according to the coordinates of the three-axis reference frame linked to the platform 2 of the articulation for the required position in the three-axis reference frame linked to the platform 2 of the articulation for the initial position, of the required angle of rotation less the angular offset value, of the angle of initial rotation and of parameters linked to the construction of the articulation, During an eighth step, for each disc, an angle of rotation of the disc is determined according to the angle of rotation of the corresponding arm and coordinates of the three-axis reference frame linked to the platform 2 of the articulation for the required position in the three-axis reference frame linked to the platform 2 of the articulation for the initial position, Each motor is controlled with the angle of rotation of the disc corresponding to the motor.

The invention claimed is:

1. Method for controlling an articulation for a robot having three degrees of freedom making it possible to direct a platform (2) according to a required position of a vector linked to the platform (2) and a required angle of rotation about the vector linked to the platform (2), the articulation comprising the platform (2), only three arms (8, 8a, 8b, 8c) and three motors (3a, 3b, 3c) each connected to a ring gear (4, 4a, 4b, 4c) via a pinion (5a, 5b, 5c), each ring gear (4, 4a, 4b, 4c) being disposed inside a hollow disc (6a, 6b, 6c) stacked on a base, such that each disc (6, 6a, 6b, 6c) is as one with a ring gear (4, 4a, 4b, 4c), each disc (6, 6a, 6b, 6c) is moreover itself as one with a disc head (7, 7a, 7b, 7c) extending in the same direction as a stack of the base and of the discs (6, 6a, 6b, 6c), for each disc head (7, 7a, 7b, 7c), a single arm (8, 8a, 8b, 8c) is connected in rotation on one hand to the disc head (7, 7a, 7b, 7c) and on the other hand to the platform (2), each motor (3a, 3b, 3c) being at least partially contained inside at least one disc (6, 6a, 6b, 6c), the platform being connected to each hollow disc by a single arm (8, 8a, 8b, 8c), the platform being therefore connected to the only three arms (8, 8a, 8b, 8c), the platform being only connected to stacked hollow discs (6a, 6b, 6c) by the three arms (8, 8a, 8b, 8c), the method comprising the steps of:

determining the coordinates of the three-axis reference frame linked to the platform (2) of the articulation for the initial position and receiving the vector normal to the platform (2) corresponding to the required position and a required angle of rotation, determining the coordinates of the rotation vector making it possible to pass from the initial position of the platform (2) to an intermediate position of the platform (2) in the three-axis reference frame linked to the platform (2) of the articulation for the initial position, the intermediate position being such that the passing from the intermediate position of the platform (2) to the required position involves a rotation of the platform (2) on itself according to a required angle of rotation, determining an angle of initial rotation making it possible to pass from the initial position of the platform (2) to an intermediate position of the platform (2), determining the coordinates of the three-axis reference frame linked to the platform (2) of the articulation for the required position in the three-axis reference frame linked to the platform (2) of the articulation for the initial position, determining the angle of rotation of the first arm according to the coordinates of the three-axis reference frame linked to the platform (2) of the articulation for the required position in the three-axis reference frame linked to the platform (2) of the articulation for the initial position, of the required angle of rotation, of the angle of initial rotation and of parameters linked to the construction of the articulation, determining the angle of rotation of the second arm according to the coordinates of the three-axis reference frame linked to the platform (2) of the articulation for the required position in the three-axis reference frame linked to the platform (2) of the articulation for the initial position, of the required angle of rotation added to an angular offset value, of the angle of initial rotation and of parameters linked to the construction of the articulation, determining the angle of rotation of the third arm according to the coordinates of the three-axis reference frame linked to the platform (2) of the articulation for the required position in the three-axis reference frame linked to the platform (2) of the articulation for the initial position, of the required angle of rotation less the angular offset value, of the angle of initial rotation and of parameters linked to the construction of the articulation, for each disc, an angle of rotation of the disc is determined according to the angle of rotation of the corresponding arm and coordinates of the three-axis reference frame linked to the platform (2) of the articulation for the required position in the three-axis reference frame linked to the platform (2) of the articulation for the initial position, each motor is controlled with the angle of rotation of the disc corresponding to the motor.

2. Method according to claim 1, wherein the rotation vector is determined as the vector product between the vector normal to the platform (2) in the initial position and the vector normal to the platform (2) in the required position.

3. Method according to claim 1, wherein the parameters linked to the construction of the articulation are the diameter of the distal circle, the diameter of the proximal circle and the centre of the proximal circle.

4. Method according to claim 1, wherein the angle of rotation is defined as the arc cosine of the scalar product of a vector normal to the platform in the initial position by a vector normal to the platform in the required position.

5. Method according to claim 1, wherein, in order to determine the coordinates of the three-axis reference frame linked to the platform (2) of the articulation for the required position in the three-axis reference frame linked to the platform (2) of the articulation for the initial position, a first quaternion is determined making it possible to pass from the initial position to the intermediate position and a second quaternion making it possible to pass from the intermediate position to the required position by a rotation of the platform on itself, determining the required position of the platform in the reference frame of the platform in the initial position applying in succession the two quaternions to the initial position of the platform.

\* \* \* \* \*